Aug. 27, 1935.  E. E. HEWITT  2,012,718
RESERVOIR RELEASE VALVE
Filed June 17, 1932
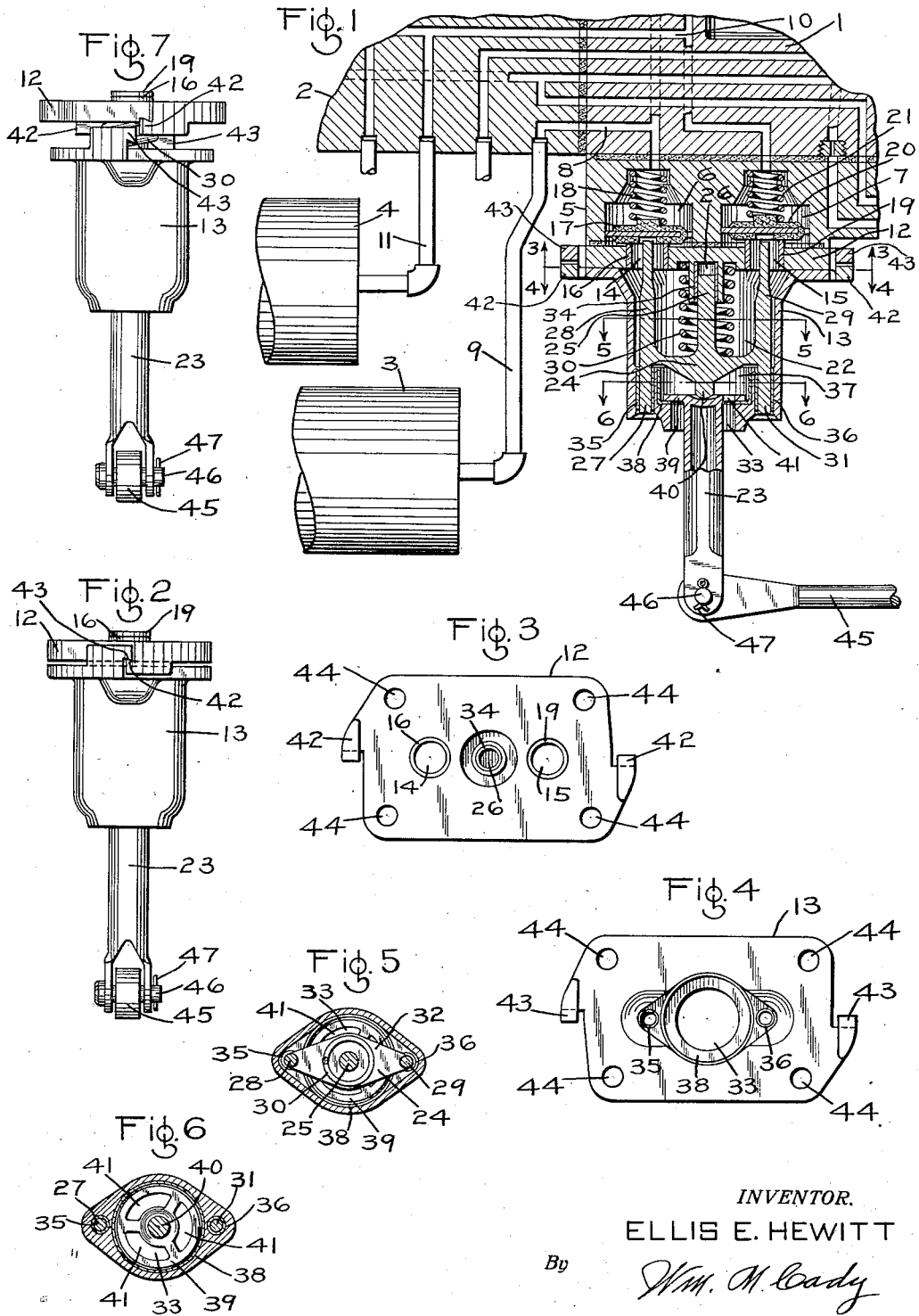
INVENTOR.
ELLIS E. HEWITT
By Wm. M. Cady
ATTORNEY.

Patented Aug. 27, 1935

2,012,718

UNITED STATES PATENT OFFICE 2,012,718

RESERVOIR RELEASE VALVE

Ellis E. Hewitt, Edgewood, Pa., assignor to The Westinghouse Air Brake Company, Wilmerding, Pa., a corporation of Pennsylvania Application June 17, 1932, Serial No. 617,790

7 Claims. (Cl. 303—80)

This invention relates to fluid pressure brakes, and more particularly to means for venting fluid under pressure from a reservoir, the present application being a continuation in part of my pending application, Serial No. 547,820, filed June 30, 1931.

In operating a train of cars equipped with fluid pressure brakes, it is desirable under certain conditions to be able to manually vent fluid under pressure from the storage reservoir or reservoirs carried on each car. For this purpose, a reservoir release valve device has heretofore been provided on a car and has been manually operated from the side of a car by a trainman.

One object of my invention is to provide an improved manually operated reservoir release valve device adapted to be employed in connection with a fluid pressure brake equipment having a plurality of reservoirs, for venting fluid under pressure from one of the reservoirs or from more than one of the reservoirs.

Another object of my invention is to provide an improved reservoir release valve device having two venting positions, one position for venting fluid under pressure from one reservoir and another position for simultaneously venting fluid under pressure from two reservoirs.

In carrying out my invention, I provide one valve for venting fluid under pressure from one reservoir and another valve for venting fluid under pressure from another reservoir. For operating these valves, a cross-head is provided and a spring acts to move the cross-head to the normal position for permitting said valves to close, the movement of the cross-head to normal position being independent of the valves. The spring just mentioned exerts a considerable force on the cross-head even in the normal position, which force would tend to make difficult the mounting of the valve device on a brake controlling valve device or the like, due to the fact that the spring would have to be maintained compressed with one hand while securing bolts or nuts were manipulated with the other hand.

Another object of my invention is to obviate the above difficulty by providing means for holding the spring acting on the cross-head compressed to substantially its normal operating condition so that said spring will not interfere with the mounting of said release valve device on the brake controlling valve device.

Other objects and advantages will appear in the following more detailed description of my invention.

In the accompanying drawing: Fig. 1 is a diagrammatic view of my improved release valve device secured to the lower side of the casing of a brake controlling valve device; Fig. 2 is an end elevation of that portion of the release valve device shown in Fig. 1 which contains the operating mechanism; Fig. 3 is a plan view of the member on which the release valves seat, said view being taken on the line 3—3 of Fig. 1; Fig. 4 is a plan view of the body portion containing the operating parts of the release valve device, said view being taken on the line 4—4 of Fig. 1; Fig. 5 is a sectional view taken on the line 5—5 of Fig. 1; Fig. 6 is a sectional view taken on the line 6—6 of Fig. 1; and Fig. 7 is an end elevation similar to Fig. 2, but showing the device in the position assumed before the cross-head operating spring is compressed, preparatory to mounting the release valve device on the brake controlling valve device.

For the purpose of illustration, my improved release valve device is shown associated with a portion of the brake controlling valve device disclosed in the pending application of Clyde C. Farmer, Serial No. 612,465, filed May 20, 1932.

As shown in the drawing, the release valve device is depended from the body portion 1 of a brake controlling valve device, said body portion being secured to a pipe bracket 2 to which two normally charged fluid pressure storage reservoirs 3 and 4 are connected, these reservoirs being the auxiliary reservoir and emergency reservoir, respectively, disclosed in the above mentioned pending application.

Secured to the body portion 1 is a casing section 5 provided with two valve chambers 6 and 7, the chamber 6 communicating through passage 8 and pipe 9 with the auxiliary reservoir 3, while the chamber 7 communicates through passage 10 and pipe 11 with the emergency reservoir 4.

Mounted on the casing section 5 is a valve seat member 12 and a body or cover 13 containing the release valve operating mechanism.

The seat member 12 closes the open end of valve chambers 6 and 7 and is provided with a through bore 14 opening into chamber 22 and a through bore 15 opening into chamber 7. The bore 14 is lined with a bushing 16 which extends into chamber 6. A release valve 17, preferably of the rubber faced poppet type, is contained in the chamber 6 and is adapted to be pressed into sealing engagement with the end of the bushing 16 by means of a spring 18 interposed between said valve and the closed end of chamber 6. The bore 15 is lined with a bushing 19 extending into chamber 7 a greater distance than bushing 16 extends into chamber 6. A release valve 20, of the same construction as release valve 17, is contained in the chamber 7 and is adapted to be pressed into sealing engagement with the end of the bushing 19, by means of a spring 21 interposed between said valve and the end wall of chamber 7.

For successively moving the release valves 17 and 20 away from the end of the seat bushings 16 and 19, a cross-head 24 is provided in a chamber 22 in the cover 13 and is adapted to be operated by means of an arm or member 23.

The cross-head 24 is provided centrally with a guide portion or pin 25 which slidably projects into a bore 26 provided in a boss formed on the seat member 12. On each side of the pin 25 and projecting from the cross-head in the opposite direction are two like guide members or pins 27 and 31 slidably projecting into suitable bores in the body 13. Opposite the pins 27 and 31 and on the cross-head are two like operating pins or fingers 28 and 29 projecting into operative relation with the release valves 17 and 20. The finger 28 does not normally engage the release valve 17, neither does the finger 27 normally engage the release valve 20. The fingers 28 and 27 are both of the same length, but on account of the valve seat bushing 19 extending into chamber 7 a greater distance than valve seat bushing 16 extends into chamber 6, the distance or space between the end of finger 29 and the release valve 20 is greater than the corresponding space between the end of finger 28 and the release valve 17.

The seat member 12 and cover 13 are preferably made of a material which may not provide a good wearing surface for moving parts, so in order to provide a wearing surface for the cross-head pin 25, a wear resisting bushing 34 is provided to line the bore 26 so that sliding movement of said pin is against said bushing. Similar bushings 35 and 36 are provided in the cover 13 around the cross-head pins 27 and 31.

The valve seat member 12 is provided with a recess surrounding the boss containing bore 26, said recess being adapted to receive one end of a spring 30, the other end of said spring being adapted to engage the cross-head on the flared portion 32 surrounding the pin 25.

The chamber 22 opens into a recess 37 which in turn is open to the atmosphere through opening 33. The recess 37 is lined with an L-shaped bushing 38 of wear resisting material and contains a circular disk-like member 39 which is mounted on the end of the operating member 23. The disk-like member 39 is of larger diameter than the diameter of the opening 33 and is provided with a recess in which an extension 40 of the cross-head 24 is adapted to engage so that the pressure of spring 30 will normally maintain the member 39 in engagement with the bushing 38, it being noted that the engagement of member 39 with bushing 38 defines the normal position to which the cross-head 24, and consequently the valve unseating fingers 28 and 29, are moved by spring 30. The disk-like member 39 is provided with a plurality of apertures 41 through which the chamber 22 and recess 37 are vented to the atmosphere.

The valve seat member 12 is provided with a hook-shaped locking lug 42 on two of its opposite sides, the lug on one side being disposed oppositely to the lug on the other side. Similar lugs 43 are provided on the cover 13 and are adapted to coact with the corresponding lugs 42 on the seat member 12 to lock said member to the cover. When the spring 30 is expanded to its free height, it will hold the seat member 12 away from the cover 13 as shown in Fig. 7. In order to facilitate the mounting of seat member 12 and cover 13 on the casing section 5, it is desirable to first confine the spring 30 so that it will not have to be compressed in the act of mounting at which time it is necessary to line up the bolt holes 44 with corresponding holes or with studs on the casing section. In order to initially confine the spring 30, the seat member 12 is turned relative to the cover 13 to the position shown in Fig. 7. Then with one hand on the seat member 12 and the other hand grasping the cover 13, the seat member is pressed into engagement with said cover, after which the member 12 is turned relatively to the cover 13 so that the lugs 42 will be turned into locking engagement with lugs 43 on the cover. Upon the removal of pressure from member 12, the spring 30 expands slightly to take up the looseness between the coacting lugs 42 and 43, thus forcing the member 12 away from the cover 13 a very slight distance, as shown in Fig. 2. It will now be evident that the operating parts are all locked in position within the cover 13 so that the mounting of the cover 13 and valve seat member 12 to the casing section 5 can be accomplished without difficulty.

The lower end of the operating member 23 is forked to receive one end of a rod 45 which is pivotally secured to said operating member by a pin 46 passing through a suitable bore in said rod and the forked end of said operating member, a cotter key 47 being provided through the end of pin 46 to maintain said pin in place. The rod 45 is adapted to extend to one side of a car so that a trainman may operate the release valve device from the side of the car.

In operation, the trainman at the side of the car pulls or pushes on the rod 45, thereby moving the lower end of the member 23. The disk-like member 39 being secured to member 23, the movement of member 23 raises one edge of said disk away from the bushing 38, said disk pivoting on the bushing 38 at its point of engagement with said bushing.

The turning up of one side of the disk 39 within the recess 37, pushes the cross-head 24 and operating fingers 28 and 29 upwardly, the operating finger 28 engaging and unseating the valve 17 from the bushing 16 before the finger 29 engages the valve 20. The unseating of valve 17 vents fluid under pressure from the auxiliary reservoir 3 by way of pipe 9, passage 8, valve chamber 6, past said valve, through bore 14, chamber 22, recess 37, apertures 41 in the member 39 and through the opening 33 to the atmosphere.

If it is desired to vent fluid under pressure from the emergency reservoir 4 at the same time as fluid under pressure is vented from the auxiliary reservoir 3, the trainman moves the member 23 a greater distance, thereby tipping the disk 39 a greater amount and causing the cross-head 24 and finger 29 to be moved inwardly a greater distance than required to unseat the auxiliary reservoir release valve 17. This further movement of the cross-head finger 29 pushes the emergency reservoir release valve 20 away from the end of the bushing 19, thereby permitting fluid under pressure to be vented from the emergency reservoir 4 through pipe 11, passage 10, valve chamber 7, past valve 20, through bore 15, chamber 22, recess 37, aperture 41 in the disk 39 and opening 33. Since the auxiliary reservoir release valve 17 is unseated when the emergency reservoir release valve 20 is unseated, as above mentioned, fluid under pressure is simultaneously vented from both reservoirs at the same time.

When the desired reduction in pressure is effected in the one or both of said reservoirs, according to whether only one or both of the release valves is unseated, the operator lets go of the pull rod 45. The pressure of spring 30 then returns the cross-head 24, disk-like member 39, member 23 and pull rod 45 to their normal positions, which permits spring 18 to seat the auxiliary reservoir release valve 17 and spring 21 to seat the emergency reservoir release valve 20.

It will be noted that the auxiliary reservoir release valve 17 is unseated upon a certain movement of member 23 and upon further movement of said member the emergency reservoir release valve 20 is also unseated, so that the trainman can either vent fluid under pressure from only the auxiliary reservoir 3 or from both of the reservoirs at the same time, if such is desirable. On account of the member 39 being circular and therefore adapted to fulcrum at any point on its periphery, it will be evident that the two release valves 17 and 20 will be unseated in the manner above described, irrespective of the direction of movement of the member 23.

A particular advantage in mounting the release valve device on the under side of the body portion 1 of the brake controlling valve device, is that dirt, cinders or other foreign material can not accumulate around or near the release valves so as to hold them from their seat and thus permit leakage from the reservoirs.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure release valve device, the combination with a casing having two valve chambers and an aperture opening into each of said valve chambers, an annular seat rib surrounding each of said apertures, one of the seat ribs projecting further into one of the valve chambers than the other seat rib projects into the other valve chamber, a poppet valve in each of said chambers engaging the seat rib, a finger projecting into one of said apertures and adapted to engage and unseat the valve closing communication through said aperture, another finger projecting into the other of said apertures and adapted to engage and unseat the valve closing communication through the other of said apertures, and manually operated means for simultaneously operating both of said fingers to successively unseat said valves.

2. In a fluid pressure release valve device, the combination with a casing having two valve chambers and an aperture opening into each of said valve chambers, a bushing carried in one of said apertures and extending into one of said chambers for providing a valve seat, a poppet valve seated on the end of said bushing, another bushing carried in the other of said apertures and extending into the other of said chambers a greater distance than the first mentioned bushing extends into the first mentioned chamber, a poppet valve seated on the end of the last mentioned bushing, and manually operated means for first moving the first mentioned poppet valve out of seating engagement with the end of the first mentioned bushing and then the last mentioned poppet valve out of seating engagement with the last mentioned bushing.

3. In a fluid pressure release valve device, the combination with a casing having a valve chamber and a cover member secured to said casing and having a vented chamber, a valve in said valve chamber for closing communication from said valve chamber to said vented chamber, a member in said vented chamber for operating said valve to open said communication, a wear bushing provided in said casing, a wear bushing provided in said cover in parallel alignment with the wear bushings in said casing, means slidably mounted in said bushings and carrying said valve operating member, and manually operated means for operating the sliding means and said valve operating member.

4. In a fluid pressure release valve device, the combination with a casing having two valve chambers, a cover member secured to said casing and having a vented chamber, a valve in each of said chambers for closing communication from its respective chamber to the vented chamber, and manually operated means in said vented chamber for operating both of said valves, said manually operated means comprising a finger adapted to operate one of said valves to open communication from its chamber to said vented chamber, another finger adapted to operate the other of said valves for opening communication from its chamber to said vented chamber, a movable cross-head carrying said fingers, a wear bushing in said casing, two wear bushings in said cover, a guide member carried by said cross-head and slidably mounted in the first wear bushing, two guide members carried by said cross-head and projecting in the opposite direction to the first mentioned guide members, said two guide members being in alignment with and slidably mounted in said two wear bushings, and a lever for moving said cross-head and fingers for operating said valves.

5. In a fluid pressure release valve device, the combination with a casing and a valve operative to vent fluid under pressure, of an operating mechanism assembly secured to said casing for operating said valve, said assembly comprising a cover member, manually operated means contained in said cover member and having a normal position, a spring for urging said manually operated means to said normal position, locking means on said cover member, a member forming a seat for said spring, and locking means on the seat member coacting with the locking means on said cover member for confining said spring under compression in said cover member.

6. In a fluid pressure release valve device, the combination with a casing and a valve operative to vent fluid under pressure, of an operating mechanism assembly secured to said casing for operating said valve, said assembly comprising a cover member, manually operated means contained in said cover member and having a normal position, a spring for urging said manually operated means to said normal position, a hook-shaped lug on one side of said cover member, an oppositely disposed hook-shaped lug on the opposite side of said cover member, a member forming a seat for said spring, and a hook-shaped lug on each of two opposite sides of the spring seat member adapted upon relative rotational movement between said seat member and said cover member to lock said members together for confining said spring under compression in said cover member.

7. In a fluid pressure release valve device, the combination with a casing having a chamber, a cover portion secured to said casing and a member interposed between said casing and cover portion, of a valve contained in said chamber and normally seated against said member, manually operated means contained in said cover portion and having a normal position and movable from said normal position for unseating said valve, a spring interposed under compression between said member and said manually operated means for urging said manually operated means to the normal position, locking means on said cover portion, and locking means on said member coacting with the locking means on said cover portion for confining said spring under compression.

ELLIS E. HEWITT.